A. DRUMMOND.
LATHE SLIDE.
APPLICATION FILED JULY 27, 1921.
1,415,226.
Patented May 9, 1922.
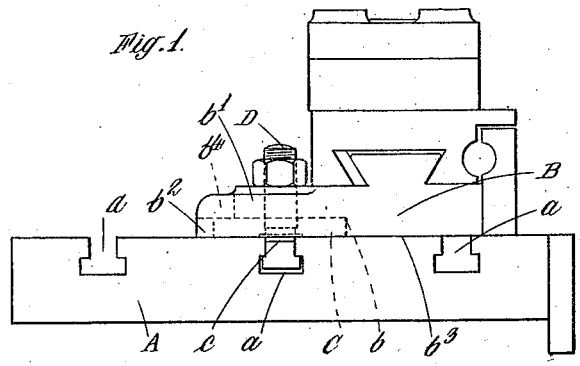
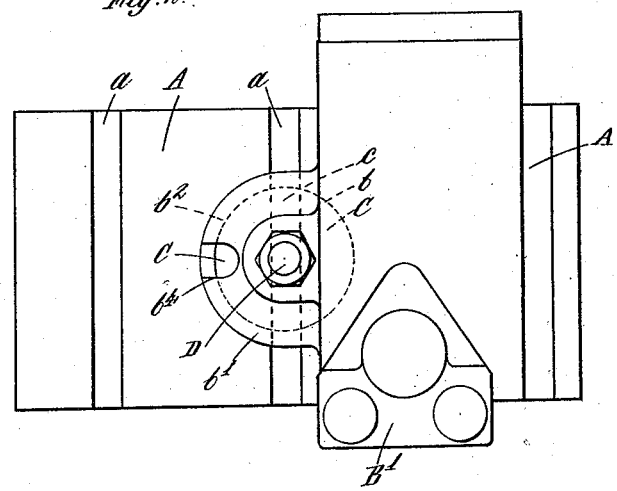

UNITED STATES PATENT OFFICE.

ARTHUR DRUMMOND, OF RYDE'S HILL, NEAR GUILDFORD, ENGLAND.

LATHE SLIDE.

1,415,226.  Specification of Letters Patent.  Patented May 9, 1922.

Application filed July 27, 1921. Serial No. 487,978.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain, residing at Ryde's Hill, near Guildford, in the county of Surrey, England, have invented certain new and useful Improvements in or Relating to Lathe Slides, (for which I have filed an application in Great Britain Apr. 16, 1919, Patent No. 139,063,) of which the following is a specification.

This invention relates to the slides of lathes of the type having a T slotted cross or lower slide adapted for use as a boring table, the chief object of the invention being to provide an improved construction and method of mounting the angularly adjustable upper slide upon the T slotted slide so that the upper slide may be firmly secured in place with its under surface truly upon the lower side.

According to this invention the lower side of the upper slide is formed with a circular recess within which lies a disc provided at its under side with a cross rib adapted to fit in one of the grooves or slots of the lower slide, the upper slide being fixed in an angularly adjustable position around the said disc by a central bolt engaging the T slot. The upper slide is not gripped upon the disc, a small clearance being allowed between the upper face of the disc and the recess in the said slide so that the gripping surface of the upper slide meets the face of the cross slide on both sides of the disc, the securing bolt locking the upper slide firmly on the face of the cross slide. This arrangement avoids the necessity for stepped gripping surfaces which in a previous construction of slides of this type have been employed, bearing both on the cross slide and the disc. Such an arrangement of stepped surfaces is very difficult to make with sufficient accuracy to provide an efficient grip while maintaining perfect parallelism between the two slides.

In order that the said invention may be clearly understood and readily carried into effect the same will now be described more fully with reference to the accompanying drawings, in which:—

Figure 1 is an elevation and Figure 2 a plan of a construction of slide embodying this invention.

A is the cross slide provided with the usual series of T slots $a$. B is the upper slide carrying the tool holder B'. C is the disc around which the upper slide can turn, the cross rib $c$ on the under side of the disc projecting into one of the T slots $a$. D is the central securing bolt.

The disc C fits closely in the circular recess $b$ in the lower face of the projecting boss $b'$ of the slide B, the boss $b'$ extending at the lip $b^2$ around the disc C. The recess $b$ is sufficiently deep to allow a slight clearance above the disc. When the central bolt D is tightened up in the usual manner by the nut $d$, the lower end of the bolt D engaging the T slot, the main lower face $b^3$ of the slide B is gripped at one side upon the upper face of the cross slide A and on the other side of the disc C the lip $b^2$ is also gripped upon the face of the slide A so as to lock the slide B firmly in position after adjustment around the disc C.

With this arrangement it will be seen that the securing of the slide is effected by a single plane surface so that it can be easily faced to maintain accurate parallelism between the two slides when secured, the disc C forming no part of the securing means and serving merely for adjustment of the slide.

For convenience in adjusting the upper slide to the desired angle around the disc, a portion $b^4$ of the slide may be cut away above the edge of the disc C so as to expose the latter to view, graduations being provided on the disc which enable the slide to be set to any desired angle. The disc C, while adjustable along the slot $a$ of the cross slide, is not angularly movable and is held securely against rotation by the rib $c$ extending into the slot.

What I claim and desire to secure by Letters Patent of the United States is:—

Securing means for the slides of lathes, in which the lower side of the upper slide is formed with a circular recess within which lies a disc provided at its under side with a cross rib adapted to fit in one of the grooves or slots of the lower slide, the upper slide being fixed in an angularly adjustable position around the said disc, without gripping the disc, by a central bolt engaging the slot, for the purpose specified.

ARTHUR DRUMMOND.